United States Patent [19]

Tyree, Jr.

[11] Patent Number: 4,878,362
[45] Date of Patent: Nov. 7, 1989

[54] CHILLER WITH EXPANDING SPIRAL CONVEYOR BELT

[75] Inventor: Lewis Tyree, Jr., Lexington, Va.

[73] Assignee: Liquid Carbonic Corporation, Chicago, Ill.

[21] Appl. No.: 211,985

[22] Filed: Jun. 27, 1988

[51] Int. Cl.$^4$ .............................................. F25D 25/02
[52] U.S. Cl. ...................................... 62/381; 198/831; 198/852
[58] Field of Search ................... 62/381; 198/831, 852

[56] References Cited

U.S. PATENT DOCUMENTS

| | | |
|---|---|---|
| Re. 27,690 | 7/1973 | Roinestad et al. ................... 198/193 |
| 2,872,023 | 2/1959 | Bechtel, Jr. ........................... 198/852 |
| 3,225,898 | 12/1965 | Roinestad ............................. 198/181 |
| 3,261,451 | 7/1966 | Roinestad ............................. 198/852 |
| 3,348,659 | 4/1967 | Roinestad ............................. 198/136 |
| 3,439,795 | 4/1969 | Roinestad et al. ................... 198/852 |
| 3,467,239 | 9/1969 | Roinestad ............................. 198/195 |
| 3,733,848 | 5/1973 | Duron et al. ........................... 62/381 |
| 3,938,651 | 2/1976 | Alfred et al. ......................... 198/136 |
| 4,023,381 | 5/1977 | Onodera ................................. 62/381 |
| 4,333,318 | 6/1982 | Tyree, Jr. .............................. 62/374 |
| 4,565,282 | 1/1986 | Olsson et al. ......................... 198/778 |

*Primary Examiner*—Ronald C. Capossela
*Attorney, Agent, or Firm*—Fitch, Even, Tabin & Flannery

[57] ABSTRACT

A chiller has an insulated enclosure for maintaining the low ambient temperatures therewithin. A conveyor belt carries food products throughout the enclosure, passing through an entrance and an exit in the enclosure. The conveyor belt includes a straight-line path section and a helical path section, and is driven by a suitable drive, such as an internal rotating drum or an endless drive belt contacting a bottom tier of the conveyor helical path section. The belt includes inner and outer links interconnected by transverse rods. Upon entering a helical path section from a straight-line path section, the conveyor belt undergoes expansion only, with the inner ends of the rods undergoing only slight relative angular movement, while the outer ends of the rods are permitted an amount of relative longitudinal movement so as to allow the conveyor belt to assume a curved configuration having the desired radius of curvature for the helical path.

12 Claims, 2 Drawing Sheets

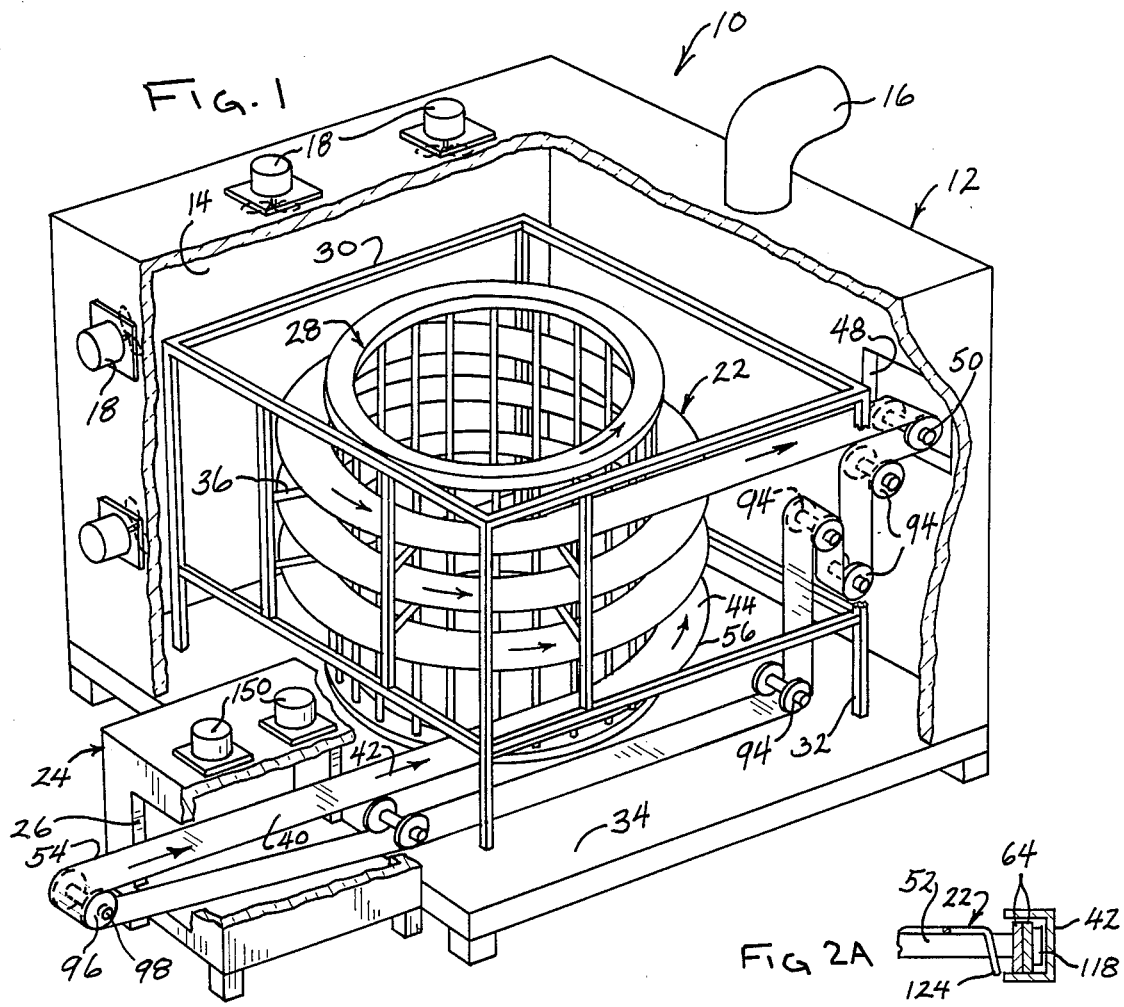
FIG. 1
FIG. 2A
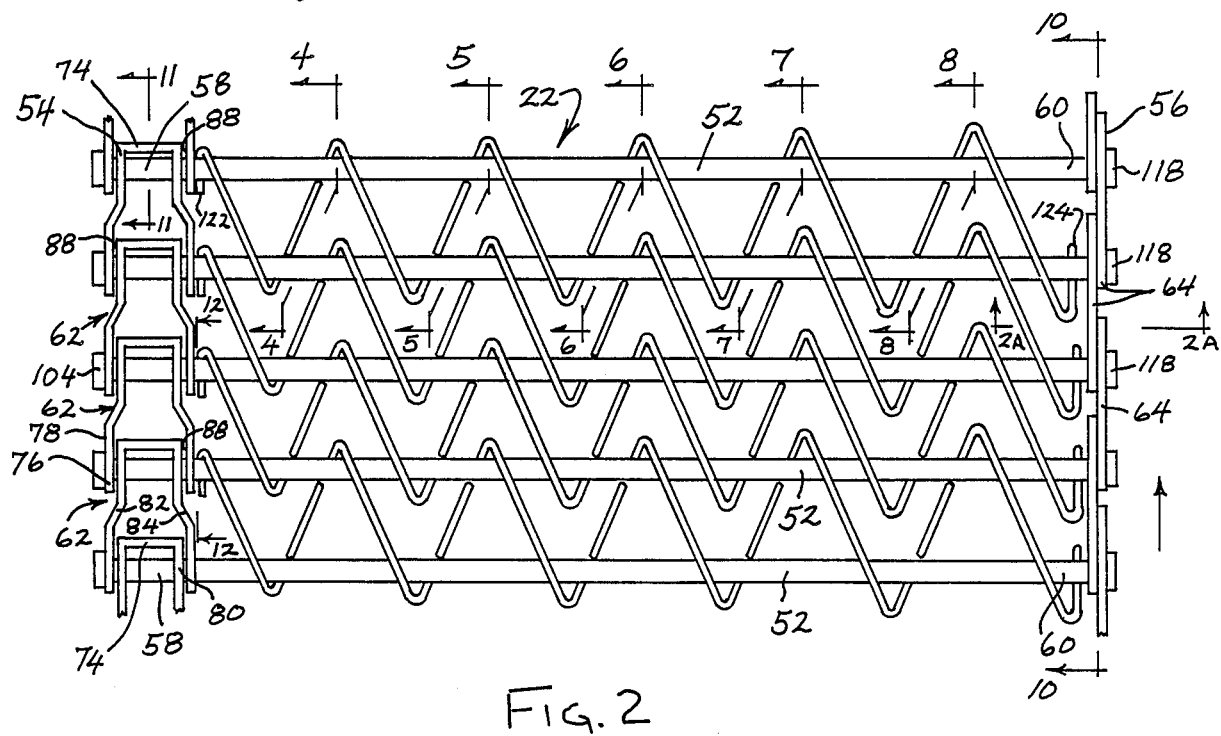
FIG. 2

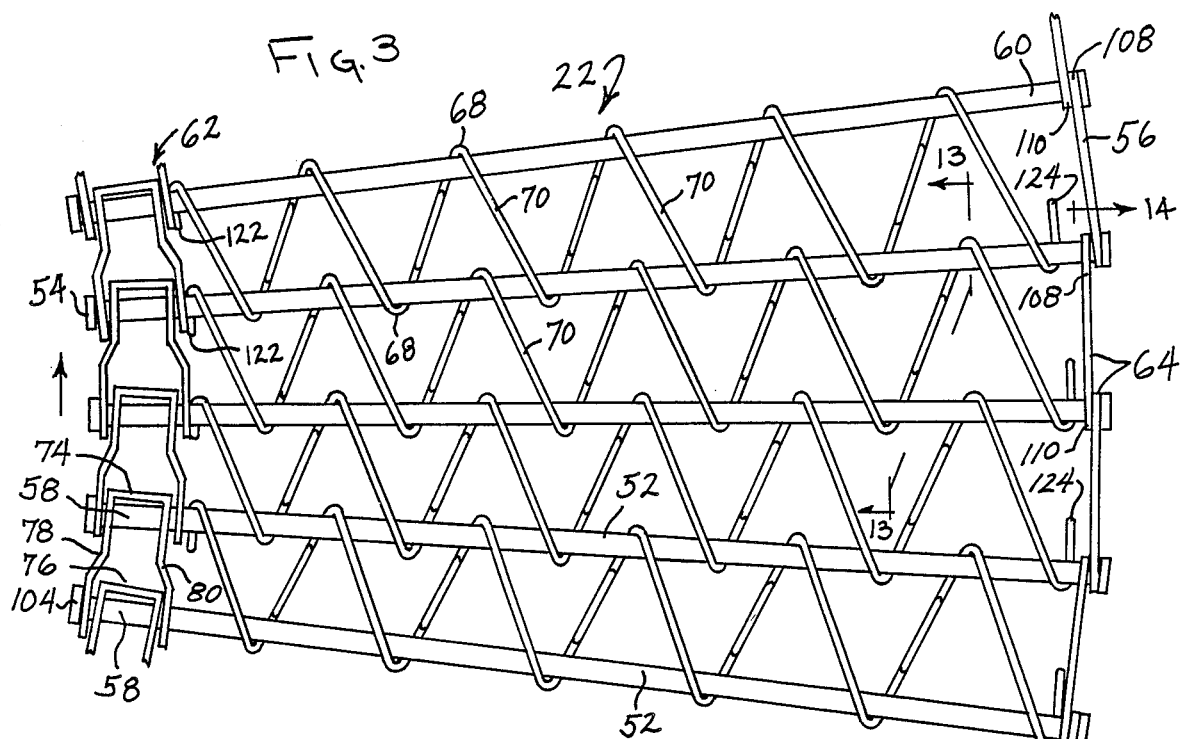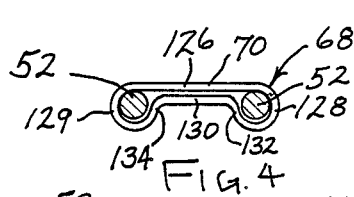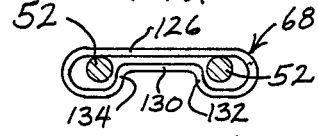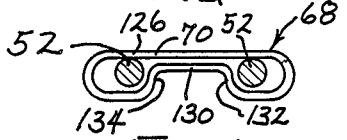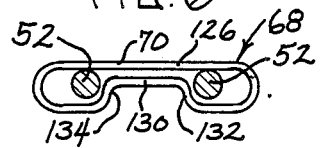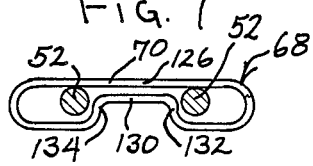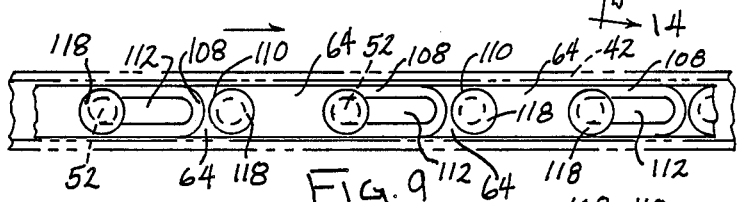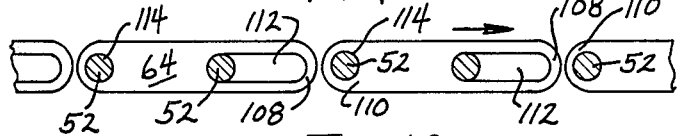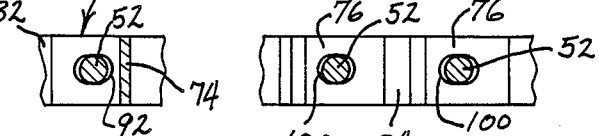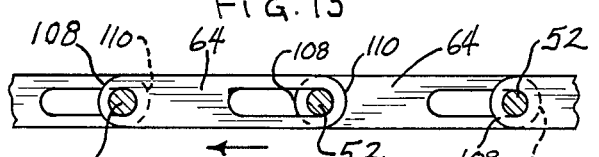

CHILLER WITH EXPANDING SPIRAL CONVEYOR BELT

BACKGROUND OF THE INVENTION

1. Field of the Invention

The present invention pertains to conveyor belts used in chillers and in particular to endless conveyor belts having a transition between a straight-line path section and a generally helical or spiral path section with one or more arrangements for eliminating disturbance to food products carried on the conveyor belt at the point of transition.

2. Description of the Prior Art

Several conveyor belt arrangements are currently in use for transporting food or other products through a chiller typically including an insulated enclosure for maintaining temperatures which are below ambient temperature. In order to provide a longer path length within an insulated enclosure of minimal volume and external surface area, the conveyor belt transporting products through the enclosure is frequently made to traverse one or more helical paths or what are generally termed "spiral" paths in the industry. Accordingly, the conveyor belts experience a change in configuration, particularly along their inner and outer edges, at the point of transition where the straight-line path section of the conveyor belt enters the helical path section. To date, conveyor belts have either undergone a contraction along their inner edge or undergone contraction and expansion along their inner and outer edges, respectively.

Several problems arise when a conveyor belt bearing relatively delicate products, such as meat patties, undergoes a contraction. Meat patties, for example, have been observed to adhere to a conveyor belt upper surface at the point of entrance to chilling enclosure. Subsequent contraction of the conveyor belt often causes damage or distortion to the bottom surface of the patty in contact with the conveyor belt. Accordingly, it is desirable to reduce or eliminate such distortion and surface damage, particularly since this frequently causes the frozen food to be rejected. Other problems arise because of belt contraction; for example, contraction of a conveyor belt might bring adjacent products into contact with one another and cause distortion. To help reduce the possibility of such contact, food products loaded upstream of the helical section are often spaced far enough apart to assure that contact is not made at the transition point where the belt assumes a helical configuration. This, however, significantly reduces the product loading density on the conveyor belt, thereby reducing the throughput of a chiller apparatus and creating other potential difficulties in a liquid cryogen freezer where liquid cryogen is sprayed onto products carried by the belt in the straight line in-feed section. To make most efficient use of cooling potential of a liquid cryogen or of $CO_2$ snow. It is considered important that the latent heat, absorbed to cause the transformation of the cryogen to its vapor state, be obtained directly from the surface of the item being frozen. Therefore if the product is unable to cover the belt as completely as possible because of the need to allow spacing between items to accommodate such reduction in surface area at the point of transition, additional of the sprayed cryogen will have to absorb its latent heat from the recirculating vapor instead of desirably extracting it directly from the items being frozen.

In an attempt to reduce problem of food distortion or surface damage at the transition point of a conveyor belt, the product may be strengthened by localized freezing, concentrated at the product's bottom surface. Using this technique, the bottom surface of a food product is made rigid enough to break adherence at its point of contact with the conveyor belt as the belt undergoes contraction at the point of transition to the helical configuration. However, such initial preparations require costly added equipment which consumes valuable floor space at the chiller entrance.

Other problems are experienced at a point of transition where a conveyor belt partially collapses to assume a helical configuration. Typically, the transition point is located immediately downstream of a product loading station, where product units are loaded on a straight section of the conveyor belt. Typically, products are loaded onto the conveyor belt from a separate loading belt, the speed of which must be matched to the speed of the conveyor belt so as to space the food products at desired intervals along the conveyor belt. At present, the most satisfactory method of matching the loading belt and conveyor belt speeds is by observing the spacing of the product units at a point downstream of the loading belt. While this method is generally satisfactory for straight-line or "tunnel-type" conveyor belts not undergoing a transition, direct visual observation in chillers having helical path sections is typically quite difficult, and accordingly, the need for adjustments in product spacing is indicated only after the product units emerge from the chiller enclosure. Thus, complete loading of a conveyor belt must oftentimes be delayed until a few sample product units have traversed the entire path through the chiller enclosure and sometimes several iterations of spacing adjustments may be needed before satisfaction is achieved.

SUMMARY OF THE INVENTION

It is an object of the present invention to provide a conveyor belt for use in a chiller apparatus, which has a transition point between a straight-line section and a helical path section, but which does not undergo a contraction at the transition point.

Another object of the present invention is to provide a conveyor belt which undergoes only an expansion at a point where the conveyor belt changes configuration as it passes from a straight-line path section into a helical path section.

These and other objects of the present invention which will become apparent from studying the appended description taken in conjunction with the drawings, is provided in a chiller which includes an insulated enclosure for maintaining temperatures below ambient temperatures having an entrance and exit. The chiller further includes a conveyor belt for carrying products such as food products from the enclosure entrance to the enclosure exit so as to pass through the controlled environment within the enclosure. Means are provided for driving the conveyor belt along an initial straight-line path to a transition point where the conveyor belt changes from a first configuration in the straight-line path section to a second configuration in a helical path section. The conveyor belt is constructed so that it undergoes only longitudinal expansion at the transition point. In particular, the longitudinal expansion is experienced only at the outer edge of the conveyor belt as the conveyor belt undergoes transition from the straight-line path section to the helical path section. Cooling means are provided within the enclosure to establish a temperature therein sufficiently low so as to remove heat from products carried along the conveyor belt.

In one embodiment, a plurality of transverse rods extend between inner and outer lateral edges of the conveyor belt. Inner ends of the rods are interconnected by first links, at points adjacent the inner lateral edge of the conveyor belt, such that there is substantially no provision for relative longitudinal movement, particularly at the transition point where the conveyor belt changes from a straight-line to a helical path configuration. However, interconnections between the links and the rods along the outer edge of the conveyor belt permit relative longitudinal movement by an amount sufficient to accommodate an increase in distance which occurs during the transition of the belt from its straight-line path to its curved path configuration.

According to other aspects of the present invention, the conveyor belt includes a fabric-like array of bent wire sections, individual sections of which are wrapped around pairs of transverse rods so as to create an extended, upper food product-supporting surface. According to other aspects of the present invention, the wire sections are formed in a zigzag configuration having alternating upper and lower elements. In one embodiment, the lower elements of the wire section are formed with upward bends in central locations so as to form leading and trailing pockets of approximately equal size, so as to limit the amount of relative movement of the transverse rods received in respective pockets when the belt changes configuration between straight-line and curved configurations.

BRIEF DESCRIPTION OF THE DRAWINGS

In the drawings, wherein like elements are referenced alike,

FIG. 1 is a perspective view of a chiller enclosure illustrating principles of the present invention;

FIG. 2 is a top plan view of the conveyor belt of FIG. 1 in its straight-line configuration in the entrance section of the chiller;

FIG. 2A is a fragmentary sectional view taken along line 2A—2A of FIG. 2.

FIG. 3 is a top plan view of the conveyor belt of FIG. 1 taken at a section along the helical path of the conveyor belt and showing its expansion configuration;

FIGS. 4–8 are cross sections of the conveyor belt of FIG. 2 taken along the lines 4—4 through 8—8 of FIG. 2;

FIG. 9 is a side elevational view of the conveyor belt of FIG. 2 in the straight-line section;

FIG. 10 is a cross-sectional view of the conveyor belt of FIG. 2 taken along the line 10—10 thereof;

FIGS. 11 and 12 are cross-sectional views taken substantially along the lines 11—11 and 12—12 of FIG. 2;

FIG. 13 is a cross-sectional view taken along the line 13—13 of FIG. 3; and

FIG. 14 is a cross-sectional view taken along the line 14—14 of FIG. 3.

DETAILED DESCRIPTION OF THE PREFERRED EMBODIMENT

Referring now to the drawings for purposes of illustration but not limitation, a chiller, generally indicated at 10, includes an insulated enclosure 12 having an internal cavity 14 which is maintained at below ambient temperature by a refrigeration system which is not shown. An inlet duct 16 is provided for connection to the refrigeration system and is suitable for introducing a refrigerated medium, such as refrigerated air into cavity 14, so as to chill or freeze products introduced therein. A plurality of fans 18 provide circulation for the cooling medium throughout the cavity 14. Fans 18, as will be seen, may be employed to direct the refrigerated medium across the surfaces of a conveyor belt generally indicated at 22, so as to provide the heat transfer rates sufficient to chill or freeze products carried thereon as the products are moved through the chiller.

The enclosure 12 includes a housing 24 having an entrance opening 26 through which products loaded on the conveyor belt enter chiller 10. Disposed within cavity 14 is a cylindrical drive drum 28 of the type disclosed in U.S. Pat. No. 3,348,659. The drive drum 28 is driven by a motor, not shown, for rotation about a central axis of the drum. The drum engages the inboard or inner edge of the conveyor belt 22 so as to drive the conveyor belt along the path illustrated in FIG. 1. An outer framework 30, has legs 32 supported by a floor 34 of the enclosure and includes a number of generally radially oriented struts 36 joined at their inner ends to the cylindrical structure. The struts 36 extend underneath the conveyor belt 22 to provide support therefor, especially at the outboard or outer edges of the belt.

As illustrated in FIG. 1, conveyor belt 22 has an initial straight-line path section 40 in which the belt passes through housing 24, traveling in the direction of the arrows 42. Restraining means such as a C-shaped channel (FIG. 2A) is preferably provided along the outboard edge of the conveyor belt 22 in the straight-line sections. Thereafter, the conveyor belt 22 enters a helical path section 44, wherein a series of windings or layers of the conveyor belt are supported by the struts 36 which support the weight of the conveyor belt and products loaded thereon, and the cylindrical structure 28 which supports the conveyor belt against sideways or lateral movement.

Upon leaving the helical path section 44, the conveyor belt 22 approaches an exit opening 48 in the enclosure 12, through which products discharged from conveyor belt 22 may be removed from chiller 10. A chute, for example, not shown in the figures, may be provided underneath the roller 50 over which the conveyor belt 22 passes, as the conveyor belt is looped through a series of rollers 94 disposed along an intermediate path section so as to return to inlet housing 24. The roller 96 located upstream of housing 24 orients the belt 22 for passage along the initial straight-line path section 40, where product may conveniently be loaded onto the conveyor belt. The roller 96 is mounted on a shaft 98 which may be driven by a motor to assist in driving the conveyor belt along its straight-line, helical and intermediate path sections. Such a driven roller 96 may incorporate a sprocket wheel at its inboard edge having teeth designed to engage the links 62 (see FIG. 2 or the inboard portions 58 of rods 52 within the links 62, in the manner disclosed in U.S. Pat. No. 3,467,239. Other suitable drive means engaging the conveyor belt 22 for propelling the conveyor belt along its path of travel can also be used. For example, an endless drive belt may be arranged to contact the bottom helical tier of a conveyor belt, in a manner shown and described in U.S. Pat. Nos. 3,938,651 and 4,565,282, the disclosures of which are herein incorporated by reference. Further, the endless drive belts can be extended to also engage at least a portion of the straight-line path of the conveyor belt, and such is contemplated by the present invention.

FIGS. 2 and 3 illustrate two different configurations of the conveyor belt 22, corresponding to the straight-line path and helical path sections of the conveyor belt, respectively. Referring additionally to FIGS. 3-14, the conveyor belt 22, when constructed according to principles of the present invention, will only expand as the conveyor belt enters the helical path section 44, where the conveyor belt is turned or curved in a horizontal plane. The changes in configuration of the conveyor belt, particularly as it leaves the straight-line path section of FIG. 2 and enters the helical path section of FIG. 3, is carefully controlled due to the construction of the conveyor belt, which will now be described with reference to FIGS. 2-14.

Referring now to FIGS. 2 and 3, the conveyor belt 22 is preferably constructed of a plurality of rods 52 extending in a direction generally normal to the straight-line path of the conveyor belt. Rods 52 have inner and outer lateral edges 54, 56 with the inner edge 54 being located at the radially inner portion of the conveyor belt in the helical path section.

The conveyor belt has lateral edges 54, 56 which are located at radially inner and radially outer portions of the conveyor belt which are wound along the helical path. The conveyor belt 22 includes a plurality of rods 52 having inner and outer end sections 58, 60 adjacent the inner and outer edges of the belt, respectively. The inner ends of rods 52 are pivotally interconnected by links 62 formed of flat wire stock. FIGS. 2 and 3 are plan views of portions of the conveyor belt, the first lying in a generally horizontal plane, and the second lying along a relatively flat but inclined portion of the helical path. By comparing FIGS. 2 and 3, it can be seen that adjacent links 62 can be pivoted or angularly displaced one from the other, the angular displacements occurring in the plane of the belt, thus allowing the inner edge of the belt to conform to a circular or helical path. The outer ends 60 of rods 52 are interconnected by a series of slotted links 64 resembling bars or flat plates. The links 64, as will be seen, allow expansion of the outer edge 56 of belt 22.

A plurality of bent wire sections 68 form an extended upper product supporting surface 70, which preferably is perforated, allowing a continuous flow of cooling medium no matter what the configuration of the belt may be, regardless of whether the belt portion supplying the food product is disposed in the straight-line or helical path sections of the conveyor belt. In the preferred embodiment, each wire section 68 is wrapped around a pair of rods 52 to create the upper surface 70 to provide other significant advantages, as will be seen herein. A pair of rods, together with a bent wire section wrapped therearound comprises a region of the conveyor belt as illustrated in the figures, each rod is common to a pair of adjacent belt regions and provides an interconnection therefor, in combination with the links disposed at the inner and outer ends of the conveyor belt.

Referring now to FIGS. 2 and 3, flat wire links 62 are generally U-shaped in plan view, having an upstream closed end 74 and downstream free ends 76. Links 62 each include a pair of sidewalls 78, 80 joined at their upstream ends to opposite ends of a front wall 74. Sidewalls 78, 80 have intermediate lateral offset portions 82, 84 located between a forward portion of reduced lateral dimension and a rearward portion of expanded dimension terminating in the open end of the link. The lateral offset of the links 62 permits their partial inter-nesting wherein the closed front end of one link is received within the expanded rearward portion of the adjacent link. The dimensions of the links 62 preferably provide a gap 88 between the adjacent sidewalls of inter-nested links to accommodate some horizontal angular displacement between adjacent inter-nested links, as illustrated in FIG. 3, when in the helical path section; in other words, the dimension between inner surfaces of the link sidewalls of the open end is considerably greater than the dimension between the outer surfaces of the link closed end inter-nested therewithin.

Referring to FIG. 11, the forward portions of sidewalls 78 have rod-receiving apertures 92 formed therein which is slightly elongated in the lengthwise direction of belt 22, that is, the straight-line direction of travel of the belt. This elongation of aperture 92 accommodates some angular displacement of rods 52. Referring again to FIGS. 2 and 3, sufficient clearance is provided between the front wall 74 of one link and the lateral offset portions of the link within which it is nested, so as to freely permit relative angular displacement between adjacent links as the links rotate about rods 52. This freedom of movement permits belt 22 to pass over guide rollers, such as the roller 50 illustrated in FIG. 1 located adjacent the discharge 48, the rollers 94 located downstream thereof, and the roller 96 which provides an upright positioning of the belt 22 as the belt enters the straight-line path section 40 at the inlet to the chiller.

Referring now to FIG. 12, the free ends 76 of the links 62 have apertures 100 formed therein to receive rods 52. As with the apertures 92, it is generally preferred that apertures 100 are slightly elongated in the direction longitudinally of conveyor belt 22 so as to permit similar horizontal angular displacement of the rods received therein. The apertures 100 of one link, when aligned with the apertures 92 of the link inter-nested therewithin, provide a passageway for the rod 52 through the nested pair of links. The inner end 58 of the rod 52 has an enlarged end 104 to prevent its outward withdrawal through the links 62. Once assembled in the belt, the rods 52 thus maintain adjacent links in nested relationship with one another.

FIGS. 9, 10 and 14 show the outer lateral edge of the belt 22 and particularly, the bar links 64 which have upstream and downstream ends 108, 110. As can be seen in FIGS. 2 and 3, the bar links 64 each interconnect a pair of adjacent rods 52, but alternate between inner and outer positions at the lateral outer edge of the conveyor belt. The links in the inner and outer positions are preferably substantially identical to one another, although as will be appreciated upon studying the following description, other configurations of links can also be used at the outer edge 56 of the conveyor belt. Links 64 have slots 112 formed therein in their trailing portions 108 which are elongated longitudinally of the conveyor belt. Each link 64 interconnects a pair of adjacent transverse rods 52, so that each rod protrudes through overlapping portions of two adjacent links.

The trailing portions of links 64 each have a rod-receiving aperture 114 formed therein which more closely conforms to the cross-sectional shape of rod 52 received therein. As seen in FIG. 2, the forward and rearward ends of adjacent links overlap each other, with the rearward aperture 114 of an upstream link being registered with the slot 112 of a downstream link. Thus, the outer end section 60 of each rod 52 is received in two partially-overlapping links, passing through the generally circular aperture 114 of one and the axially elongated slot 112 of the other along which permits relative sliding movement. The outer ends 60 of rods 52 are each provided with an enlarged head portion 118 which prevents the withdrawal of the rod through those links despite forces experienced by the conveyor belt as the belt traverses its path through the chiller.

FIGS. 9 and 10 show the alignment of the bar links 64 at a straight-line section of the conveyor belt where each rod 52 is positioned adjacent the trailing end of the elongated slot 112. As the conveyor belt enters a helical path section and the rods 52 become horizontally angularly displaced from one another, the inner ends of the rods undergo only a relatively small amount of angular displacement as a part of the expansion of the belt. The outer ends 60 of the rods 52 are spread substantially apart from one another as permitted by the elongation of the slots 112 of the outer bar links 64 having a length several times the diameter of the rods 52.

As conveyor belt 22 leaves the straight-path section and enters the helical path section at the point of transition, the spacing is held substantially constant by contact with the drive drum 28 along the inboard edge and thus belt fabric must expand longitudinally across its entire width. The transition of the rods from the parallel orientation (FIG. 2) to the angular orientation (FIG. 3) pivots each rod forward, with the outer end of the rod being displaced in a forward direction with the slots 112 permitting such movement relative to the adjacent rod. As the rods pivot from the configuration of FIG. 2 to the configuration of FIG. 3, the bent wire sections 68 also spread apart, pulled by the rods 52 during the change in the conveyor belt configuration.

The bent wire sections 68 terminate in inner ends 122 and outer ends 124 which may be wrapped around the respective rod. The bent wire sections are generally trapezoidal or pie-shaped in plan view, having a small inboard dimension that flares outward to a relatively wider outer end. As seen in the cross-sectional views of FIGS. 4–8 and 13, wire sections 68 approximate a flattened spiral loop defining an enclosed interior portion and including a generally horizontal upper portions 126 and curved connectors 128, 129.

FIGS. 4–8 show a series of cross-sectional views starting adjacent the inner edge of the conveyor belt (see FIG. 4) and extending toward the outer edge of the conveyor belt (see FIG. 8) for a straight-path section of the conveyor belt wherein the adjacent rods 52 are generally parallel to each other. As can be seen by comparing FIGS. 4–8, the length of the upper portion 126 of the bent wire sections 68 increases moving toward the outer edge of the conveyor belt. Disposed on the underside of each turn of the flattened spiral is an upwardly-extending indentation 130 of generally constant length throughout the width of the conveyor belt.

Referring to the cross-sectional view of FIG. 4, taken adjacent the inner edge of the conveyor belt, indentation 130 has a pair of legs 132, 134 which in combination with the curved connectors 128, define passageways which, along with the rod-receiving passageways of the links 62 are slightly elongated so as to provide clearance for the angular displacement of the 52 which occurs. By comparing the rod-receiving passageways of FIG. 4 to those of FIGS. 5–8, it can be seen that the passageways for each pair of rods 52 associated with each bent wire section increase in elongation from the inner to the outer ends of the conveyor belt.

As can be seen by comparing FIGS. 4–8, rods 52 in the straight-path section are generally parallel to each other and reside in pockets formed in the bent wire section passageways lying adjacent the legs 132, 134 of the indentations 130. As the conveyor belt enters the helical path section, the rods 52 are angularly displaced spreading outward in the pockets to the positions shown in FIG. 13 where the rods 52 contact the curved connectors 128, 129.

The free ends 122, 124 of the bent wire sections may be wrapped around the rods or may include stub portions received in apertures formed in the rods 52. Preferably, the bent wire sections are formed of a relatively stiff wire material which maintains its spirally bent shape, and in particular, maintains the shape of the indentations 130, regardless of the angular displacement between adjacent rods 52 disposed within the bent wire section. A bent wire section 68, as mentioned above, approximates a flattened spiral winding. The pitch of the winding has not been found to be particularly critical, although the pitch preferably is not so small as to impede air flow therethrough, nor so large as to detract from the support given food-products carried thereon. If desired, the pitch of the bent wire sections can be changed between the inner and outer ends thereof.

According to particular aspects of the present invention, the indentations 130 located at each winding of the bent wire sections are preferably similarly dimensioned, with the separation between the legs 132, 134 of each indentation preferably corresponding to the separation between rods 52 located in a straight path section of the conveyor belt. As will be explained further herein, the indentations 130 at regular intervals along the width of the conveyor belt assure that the rods will not collapse (i.e., will not be displaced toward each other further than their parallel spacing) when disposed in the straight line path section. This provides a degree of control over the spacing of rods 52 and some control over the contraction of the rods when the endless belt leaves the helical path section 44 and reenters the straight-path section immediately upstream of the discharge 48. If the belt is driven by contact with the links 62, when the belt reenters the straight-line path, there is no positive force acting on the rods to return them to the parallel configuration shown in FIG. 2 and preferably some restraint is provided to the right-hand (FIG. 3) or outboard edges of the belt to assure this occurs. For example, the ends of adjacent pairs of rods 60 could be cammed by special shoes or the like to return to a defined spacing, or upper and lower guides or restraints, such as the flanges of the C-shaped channel 42 shown in phantom in FIG. 9, might be added along the short path leading to the discharge and throughout the length of the path of the belt where it travels in a straight line, thereby restraining the edge of the belt to a flat plane and accordingly causing substantially parallel realignment of the rods to occur.

The indentations 130 additionally, positively prevent any contraction of the conveyor belt at a point of transition where the conveyor belt enters a helical path section located downstream of the straight-line path section. Contraction of the conveyor belt is effectively prevented throughout the length of each rod entering the transition at a multiple number of points spaced along the rods. Accordingly, the change in conveyor belt configuration during transition from a straight-line path to a helical path, is limited to expansion only.

Due to operation of the conveyor belt as will be explained further herein, the regions of the conveyor belt approaching a transition into a downstream helical path have a defined orientation in which the transverse rods of the conveyor belt are parallel to one another and are preferably maintained at a minimum spacing, with each rod contacting the upstanding indentation portions of adjacent bent wire sections. The conveyor belt is driven, as stated above, by the cylindrical driving drum 28. As the conveyor belt enters the helical path section, the inner end of the conveyor belt contacts the drive drum, and the inboard edge of the conveyor belt is forced to conform to the radius of drum surface, causing a pivoting of the rods 52 about their inner ends.

Any contraction of the conveyor belt, especially the upper product-supporting surface thereof, is effectively prevented by the indentations adjacent the inner end of the conveyor belt, and also by the spacing between the upstream and downstream apertures of the U-shaped links 62. Heretofore, contraction at the inner edges of like conveyor belts has occurred, due to the uncontrolled contraction forces experienced by the conveyor belt regions at the inner edges thereof. In the illustrated embodiment, pivoting of the rods 52 about the fixed spacing at the inner outer ends thereof forces the conveyor belt to undergo expansion only along its outer edge. As explained above, the bar links 64 permit the outer ends of rods 52 to spread apart the desired distance. The expansion along the outer edge of the conveyor belt may ordinarily have a tendency tend to cause a contraction at the conveyor belt inner end; however, the indentations of the bent wire sections and the spacing between the upstream and downstream apertures of U-shaped links 62 effectively prevent such contraction.

Accordingly, the only change in configuration of the conveyor belt at the transition point is an expansion of the conveyor belt, and no contraction occurs. This provides a significant improvement for many types of products carried on the conveyor belt. For example, meat patties loaded onto the upper surface of the conveyor belt at the entrance to the chiller, at or near room temperature, are soft and easily deformed. In order to provide adequate support for the meat patties, the conveyor belt regions are dimensioned such that a patty of typical size will span several regions. If the conveyor belt should undergo contractions between the various regions underneath the patty being compressed together, portions of the undersurface of the patty will undergo relative movement. Accordingly, the patty, or at least the undersurface thereof, will become deformed. However, it has been found that such patties do not experience nearly as much distortion if exposed only to an expansion of the conveyor belt regions supporting their underneath surface, and in addition, cooling tends to strengthen foods so they do not distort. A spiral belt that only expands will run with a straight-line speed which is equal to the linear speed of the radially inner edge of the helical belt, which is considerably slower than one that only contracts and that runs at a speed equal to the radially outer edge of the belt for the same food loading throughout. Accordingly, the opportunity for cooling in the straight-line entrance section is considerably enhanced due to the longer residence time which results from the slower belt speed in that portion. Furthermore, when cryogen sprays are desired to greatly enhance cooling in the entrance section, the closely spaced product on the expanding only belt in such a straight section allows substantially more efficient spraying of cryogen because it is feasible to cover a much higher percentage of the belt surface area. Accordingly, chillers which employ a conveyor constructed according to foregoing principles offer significant advantages for freezing these types of products, since only expansion and no contraction is experienced by the conveyor belt at its point of transition where it enters a helical path.

Operation of the conveyer belt to achieve a well-defined orientation in the straight-line path section prior to the helical path section will now be described. The indentations 130 are preferably dimensioned so as to complement the spacing between rods for sections of the conveyor belt disposed in a straight-line path, as illustrated in FIG. 2. It can be seen, upon observing the arrangement of rods and bent wire sections 68, that two bent wire sections are associated with each rod. Of particular importance is the association of a series of indentations 130 of a bent wire section with the rods. Conveyor belts of the type described herein can experience compressive forces while traveling through the straight path section. These compressive forces, when applied to the series of indentations of a bent wire section, apply an aligning force throughout the length of the rods 52.

As can be readily observed upon examining the bent wire sections of FIGS. 2 and 3, the series of indentations of each bent wire section form two parallel guide surfaces, one along the forward legs 132 of each indentation, and the second along the trailing legs 134 of those same indentations. As pointed out above, it is preferred that the distances by which the legs 132, 134 of each indentation are separated are equal in length, and since the bent wire sections are also preferably formed so as to be rigid and nondeformable under typical operating conditions, the present invention could allow the rods 52 to be economically formed from material which, if unsupported, might allow a slight bowing of the rods over their entire length, from inner to outer ends during contraction of the conveyor belt. The series of spaced-apart indentations and especially the legs 132, 134 thereof, provide an effective guide surface along the length of each rod. These guide surfaces, one adjacent the upstream edge of each bent wire section and the other located adjacent the downstream portion thereof, guarantee a linear alignment of the central axis of each rod. As described above, the guide surfaces of a bent wire section are advantageously made parallel and spaced apart from each other so as to provide the desired parallel spacing between adjacent rods of the conveyor belt, as will now be explained in greater detail.

As the conveyor belt travels along the straight-line path, the series of indentations of each bent wire section in the path contacts an upstream rod, aligning that rod in desired transverse orientation, generally perpendicular to the path of travel of the conveyor belt. Further, the series of indentations of the bent wire sections, when seated against an upstream rod, makes rigid the guide surface of its legs, thereby providing a parallel alignment of a downstream rod being urged against the downstream legs 134. It has been found that the orientation between adjacent rods is quickly and easily achieved at a point where the conveyor belt undergoes slight compression forces. Such compression forces may occur when frictional forces are imparted to the conveyor belt sufficient to cause the various regions of the belt to compact, or "bunch up", particularly when such compression is experienced by empty portions of the conveyor belt, before its being loaded with product.

The present invention also prevents bowing of the rods between their inner to outer ends during expansion of the conveyor belt. The inner ends of the rods are controlled by the U-shaped links 62 and more particularly, by the apertured passageways formed in nested pairs of links. The outer ends of the rods 52 are also controlled during expansion as their movement is limited by the length of the slots formed in bar links 64. The bar links 64 at the outer ends of the conveyor are identical in construction, whether located at the outer or inner overlapping positions. The bar links 64 limit the separation of the outer ends of rods 52, as the conveyor belt undergoes an expansion. The bent wire sections 68, as described above, are tapered when viewed in plan view, so as to have increasing width from the inner to the outer ends of the bent wire section. The taper of the bent wire sections closely conforms to the maximum separation between adjacent rods. Accordingly, in the expanded orientation of the conveyor belt, the rods 52 preferably contact the curved connectors 128, 129 of each turn of the bent wire section, as can be seen in the plan view of FIG. 3, the curved connectors of a pair of bent wire sections alternately contact each rod along the length thereof, effectively preventing any bending or bowing thereof.

As described above, the chiller circulates refrigerated vapor or air in its interior and through the various windings of the conveyor belt and across the food products carried thereon. Chillers of this design which freeze food products by maintaining a temperature substantially below 0° C. are believed to have particular advantages. Using techniques that are well-known in the art today, the chiller described above can be readily adapted for use with liquid carbon dioxide or liquid nitrogen as a refrigeration medium for achieving cryogenic temperatures within the interior of the chiller enclosure. A particular advantage of the conveyor belt constructed according to principles of the present invention is its ability to maintain smooth, trouble-free operation of its various movable parts whether exposed in a medium of refrigerated, moisture-laden air having a propensity to deposit frost on the moving parts, or immersed in a liquid cryogen, such as liquid nitrogen.

Another particular advantage of a chiller and conveyor belt constructed according to principles of the present invention is that the housing 24, located adjacent the entrance portion of the chiller and surrounding the straight-line path section 40 of the conveyor belt, can include nozzle means 150 for expanding liquid carbon dioxide or liquid nitrogen over the surfaces of the conveyor belt disposed within the housing 24. In addition to providing an efficient, initial quick-freezing of food products which substantially completely cover the surface of the conveyor belt, the use of such expanding nozzle means can reduce the loss of moisture from the interiors of the food products by pretreating the conveyor belt and food products carried thereon to quickly crust the food products.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A chiller comprising an insulated enclosure for maintaining temperatures below ambient temperatures therewithin, means forming an entrance and an exit in said enclosure, an endless conveyor belt for carrying products from said entrance to said exit throughout said enclosure, means for driving said conveyor belt so that said endless conveyor belt follows along an initial straight-line path section and then along a helical path section which helical path constitutes a significant portion of said belt's total pathway, and cooling means for establishing a temperature within said enclosure sufficiently low to satisfactorily remove heat from products carried along said conveyor, said belt being constructed so that, in changing its orientation during the transition from said straight-line path section to said helical path section, only longitudinal expansion of appropriate regions of said belt occurs.

2. A chiller in accordance with claim 1 wherein said belt includes a plurality of transverse rods extending from an inner lateral edge to an outer lateral edge thereof, which rods are interconnected by first links near the ends thereof adjacent the inner lateral edge in said helical path such that there is substantially no provision for relative expansive longitudinal movement, whereas interconnections between the links and rods along the outer edge of said belt permits relative expansive longitudinal movement of an amount sufficient to accommodate the increase in distance which occurs during the transition of the belt from its straight-line path configuration to a curved configuration having a desired radius of curvature for said helical path.

3. A chiller in accordance with claim 2 wherein said conveyor belt includes a fabric of bent wire sections, each of which sections is wrapped around a pair of transverse rods to create an extended, upper food product supporting surface.

4. A chiller in accordance with claim 3 wherein said wire sections are formed in generally zigzag configuration, having a plurality of alternating upper and lower elements that lie, respectively, in generally parallel horizontal planes and are interconnected by curved elements which bend around said transverse rods.

5. A chiller in accordance with claim 4 wherein second links having longitudinal slots interconnect adjacent rods along the outer lateral edge of said belt, which slots receive said transverse rods near the ends thereof and are of a sufficient length to allow the desired relative movement of said rods in changing from said straight-line path configuration to said curved configuration of said helical path.

6. A chiller in accordance with claim 5 wherein said lower elements of said wire sections are formed with upward bends in central locations which form leading and trailing pockets of about equal size that limit the amount of relative movement of said transverse rods in changing between the straight-line configuration of the belt and the curved configuration of the belt.

7. A chiller in accordance with claim 2 wherein said belt driving means includes rotatable drum means mounted to rotate about a vertical axis, the outer surface of which drum means engages said inner lateral edge regions of said belt wherein said first links are located.

8. A chiller in accordance with claim 1 wherein said cooling means maintains a temperature substantially below 0° C. so that freezing of said food products occurs therewithin.

9. A chiller in accordance with claim 8 wherein said cooling means includes means for spraying liquid carbon dioxide or liquid nitrogen onto products carried by said belt.

10. A chiller in accordance with claim 9 wherein said enclosure means includes an entrance section through which said straight-line path section of said belt extends and in which section said spray means is provided.

11. A chiller comprising an insulated enclosure for maintaining temperatures below ambient temperatures therewithin,
    means forming an entrance and an exit in said enclosure,
    conveyor belt means for carrying food products from said entrance to said exit throughout said enclosure, said conveyor belt means including a plurality of interconnected belt regions longitudinally movable with respect to one another so as to change the belt from one configuration to another, and said conveyor belt means extending along a straight line path section and a helical path section which helical path section constitutes a significant portion of the conveyor belt's total path length,
    means for driving said conveyor belt means which includes an endless driving belt which follows the conveyor belt initially along the straight-line path section thereof and then along a portion of the helical path section thereof, and
    cooling means for establishing a temperature within said enclosure sufficiently low to satisfactorily remove heat from food products carried along said conveyor,
    said conveyor belt means being constructed so that, in changing its configuration during a transition from said straight-line path section to said helical path section, only longitudinal expansion of appropriate regions of said belt occurs.

12. The chiller of claim 11 wherein said conveyor belt means has inner and outer lateral edges, with first and second links adjacent the inner and outer lateral edges, respectively, and a plurality of rods having inner and outer ends, the inner ends of said rods interconnected to adjacent first links and the outer ends of said rods interconnecting adjacent outer links such that there is substantially no provision for relative longitudinal movement between the inner ends of said rods, whereas relative longitudinal movement between the outer ends of said rods is permitted in an amount sufficient to accommodate the increase in distance occurring during transition of the conveyor belt means from its straight-line path configuration to a curved configuration having a desired radius of curvature for said helical path.

* * * * *